United States Patent
Gough et al.

(10) Patent No.: US 11,345,477 B2
(45) Date of Patent: May 31, 2022

(54) ADJUSTABLE PRELOAD SEVERANCE CUTTER FOR EJECTION SYSTEMS

(71) Applicant: AMI Industries, Inc., Colorado Springs, CO (US)

(72) Inventors: David Linden Gough, Monument, CO (US); Jeff Benjamin, Colorado Springs, CO (US); Matthew D. Salois, Vacaville, CA (US)

(73) Assignee: AMI Industries, Inc., Colorado Springs, CO (US)

( * ) Notice: Subject to any disclaimer, the term of this patent is extended or adjusted under 35 U.S.C. 154(b) by 373 days.

(21) Appl. No.: 16/707,810

(22) Filed: Dec. 9, 2019

(65) Prior Publication Data

US 2021/0171207 A1   Jun. 10, 2021

(51) Int. Cl.
  *B64D 25/10*   (2006.01)
  *B26D 7/26*   (2006.01)
  *B26D 5/08*   (2006.01)

(52) U.S. Cl.
  CPC ............... *B64D 25/10* (2013.01); *B26D 5/08* (2013.01); *B26D 7/2614* (2013.01)

(58) Field of Classification Search
  CPC .......... B64D 25/10; B64D 17/38; B26D 5/08; B26D 7/2614
  See application file for complete search history.

(56) References Cited

U.S. PATENT DOCUMENTS

| | | | | |
|---|---|---|---|---|
| 3,142,219 | A * | 7/1964 | Martin | B64D 17/38 60/632 |
| 4,619,424 | A * | 10/1986 | Twardawa | B64D 17/38 244/151 B |
| 6,814,183 | B2 * | 11/2004 | Horvath | B64D 25/14 193/25 B |
| 7,717,216 | B2 * | 5/2010 | Van Rooyen | B60R 22/322 83/639.4 |
| 7,938,444 | B2 * | 5/2011 | Williams | B60R 21/2338 280/739 |
| 2006/0284404 | A1 * | 12/2006 | Green | B60R 21/231 280/743.2 |

* cited by examiner

*Primary Examiner* — Richard G Davis
(74) *Attorney, Agent, or Firm* — Snell & Wilmer L.L.P.

(57) ABSTRACT

A severance cutter may comprise a housing and a blade may be coupled to the housing. A restraint support may be configured to translate relative to the blade. A spring may be configured to bias a support opening defined by the restraint support away from the blade.

20 Claims, 5 Drawing Sheets

US 11,345,477 B2

ADJUSTABLE PRELOAD SEVERANCE CUTTER FOR EJECTION SYSTEMS

FIELD

The present disclosure relates to ejection systems, and more specifically, to an adjustable preload severance cutter for ejection systems.

BACKGROUND

Ejection seats are designed to expel pilots from an aircraft. Upon initiation of an ejection sequence, the ejection seat translates upward along rails as the seat is propelled out of the aircraft. Ejection seats generally include a leg restraint system, which is employed to restrain the seat occupant's legs during the ejection sequence, which tends to reduce leg flail upon the occupant entering the windblast outside the cockpit. In this regard, it is desirable to deploy the leg restraint system while the seat is located inside the cockpit. Leg restraint systems may include a mechanical attachment (e.g., a lanyard) between a fixed location on the aircraft and the leg restraints. The mechanical attachment is configured to translate the leg restraints to a retracted position, wherein the seat occupant's legs are restrained, in response to the ejection seat translating up the ejection rails and out of the aircraft. The timing and load associated with severing the mechanical attachment should be precise to avoid taking energy away from the rocket catapult used to propel the ejection seat.

SUMMARY

A severance cutter is disclosed herein. In accordance with various embodiments, the severance cutter may comprise a housing, a blade coupled to the housing, a restraint support configured to translate relative to the blade, and a spring adjustably coupled to the restraint support. The spring may be configured to bias a support opening defined by the restraint support away from the blade.

In various embodiments, a cap may be coupled to the housing. In various embodiments, the spring is configured to bias the restraint support toward the cap. In various embodiments, the spring is configured to bias the restraint support away from the cap.

In various embodiments, the housing defines an opening. A cutting edge of the blade may be exposed by the opening. In various embodiments, a collar may be adjustably coupled to the housing. In various embodiments, the housing defines a first threaded surface configured to engage a second threaded surface defined by the collar.

A leg restraint system for an ejection seat is also disclosed herein. In accordance with various embodiments, the leg restraint system may comprise a leg restraint, a pully operably coupled to the leg restraint, and a severance cutter coupled to an end of the leg restraint. The pully includes a wheel. The leg restraint is located through the pully and the pully is configured to allow the wheel to rotate in a first direction and to restrict a rotation of the wheel in a second direction opposite the first direction. The severance cutter may include a housing, a blade coupled to the housing, a restraint support configured to translate relative to the blade, and a spring adjustably coupled to the housing. The spring may be configured to bias the leg restraint away from the blade. The leg restraint is located through a support opening defined by the restraint support.

In various embodiments, the severance cutter further comprises a collar adjustably coupled to the housing and a cap coupled to the housing. In various embodiments, the spring is configured to bias the restraint support toward the cap. In various embodiments, the spring is configured to bias the restraint support away from the cap.

In various embodiments, the housing defines an opening, and the leg restraint is located through the opening. In various embodiments, the severance cutter further includes a lock nut configured to restrict translation of the collar relative to the housing.

In various embodiments, a load associated with translating the restraint support is increased by translating the collar relative to the housing. In various embodiments, the housing defines a first threaded surface configured to engage a second threaded surface defined by the collar. In various embodiments, a lanyard may be coupled to at least one of the cap or the collar.

An ejection seat is also disclosed herein. In accordance with various embodiments, the ejection seat may comprise a seat pan, a leg restraint coupled to the seat pan, and a severance cutter coupled to an end of the leg restraint. The severance cutter may include a housing, a blade coupled to the housing, a restraint support configured to translate relative to the blade, and a spring configured to bias the leg restraint away from the blade. The leg restraint is located through a support opening defined by the restraint support.

In various embodiments, the severance cutter further comprises a cap coupled to the housing, and the spring is configured to bias the restraint support toward the cap.

In various embodiments, the severance cutter further comprises a cap coupled to the housing, and the spring is configured to bias the restraint support away from the cap.

In various embodiments, the severance cutter further comprises a collar adjustably coupled to the housing, a load associated with translating the restraint support is increased by translating the collar relative to the housing.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
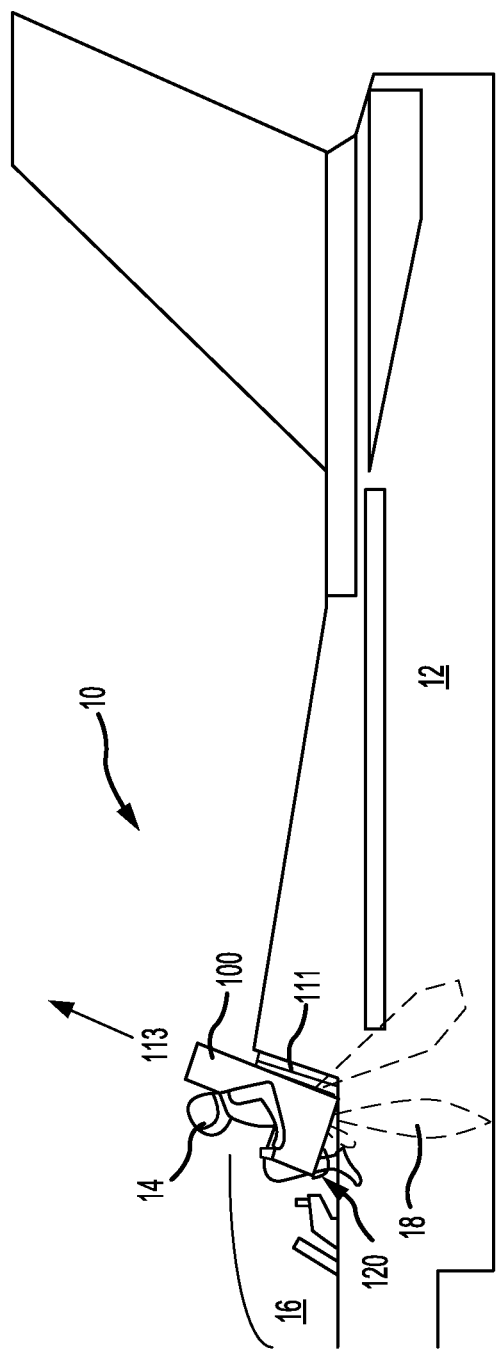
FIG. 1 illustrates an ejection seat being launched from an aircraft cockpit, in accordance with various embodiments.

With reference to FIG. 1, an aircraft ejection system 10 is shown, in accordance with various embodiments. Aircraft ejection system 10 may be installed in aircraft 12 to expel an ejection seat 100 and an occupant 14 of ejection seat 100 from a cockpit 16 of aircraft 12. Ejection seat 100 may be urged from cockpit 16 by a propulsion system 18. As described herein, ejection seat 100 may include a leg restraint system 120 configured to translate the legs of occupant 14 toward ejection seat 100, in response to deployment of aircraft ejection system 10. For example, leg restraint system 120 may translate the legs of occupant 14 toward ejection seat 100 in response to translation of ejection seat 100 along rails 111 and away from a floor of aircraft 12 (e.g., in the direction of arrow 113).

Figure 2A:
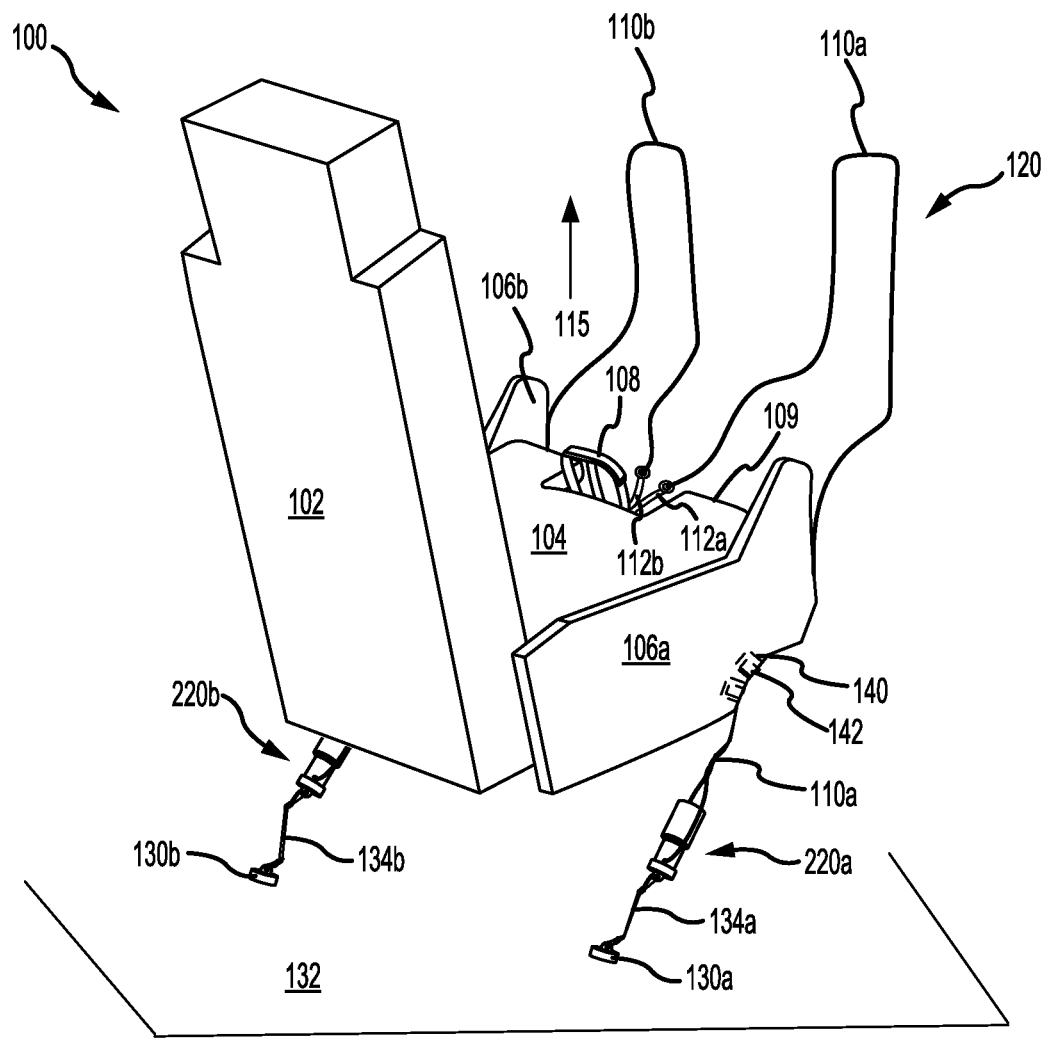
FIG. 2A illustrates a perspective view of an ejection seat in a non-deployed state, in accordance with various embodiments.
Figure 2B:
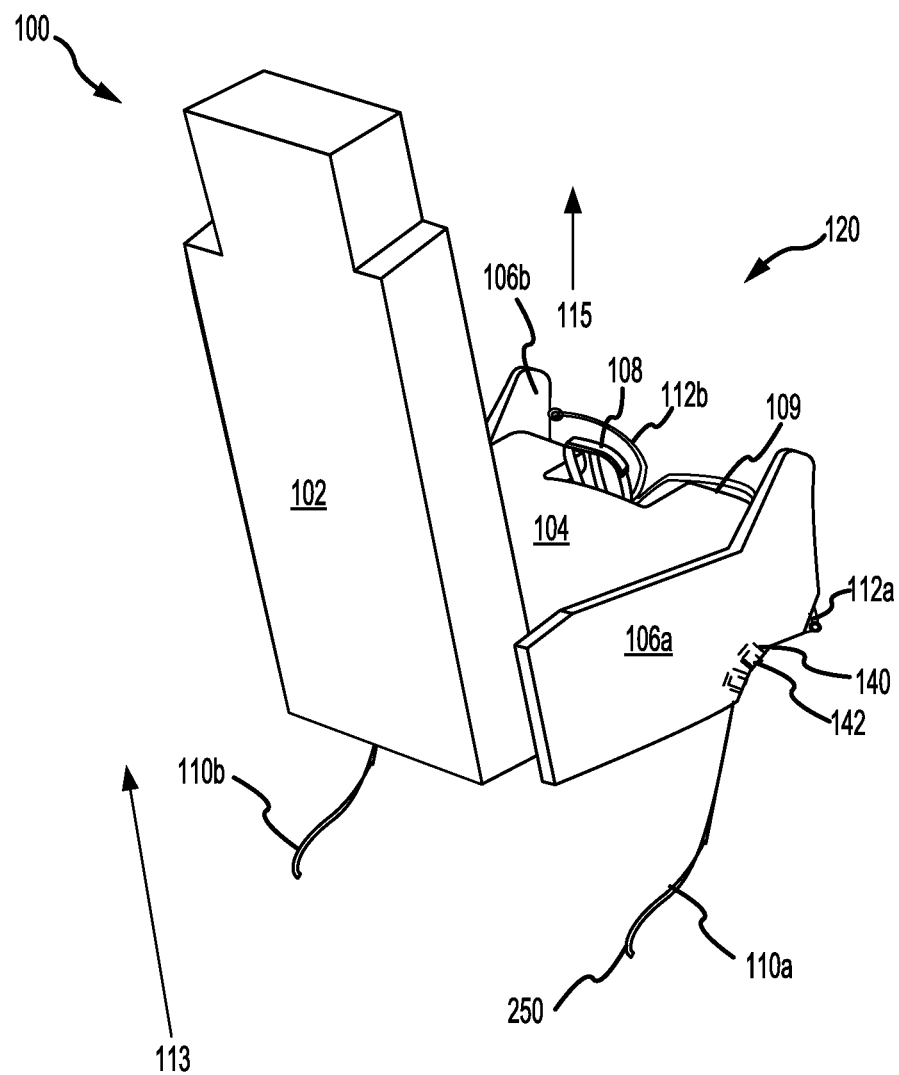
FIG. 2B illustrates a perspective view of an ejection seat in a deployed state after severance of the leg restraints, in accordance with various embodiments.
Figure 2B:
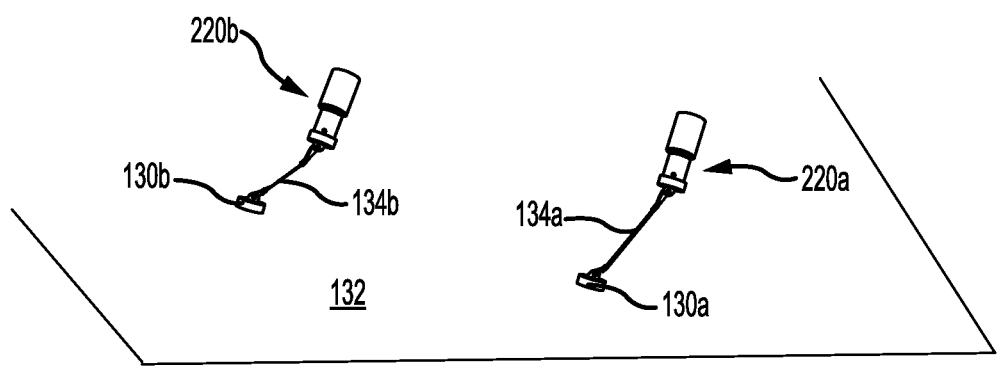

With reference to FIGS. 2A and 2B, ejection seat 100 including leg restraint system 120 is illustrated. In FIG. 2A, leg restraint system 120 is shown in the non-retracted state, prior to deployment of ejection seat 100 and prior to severance of the leg restraints. In FIG. 2B, leg restraint system 120 is shown in the retracted state, after deployment of ejection seat 100 and after severance of the leg restraints.

In accordance with various embodiments, ejection seat 100 includes a seat back 102 and a seat pan 104. A first side panel 106a of ejection seat 100 is located along a first side of seat pan 104. A second side panel 106b of ejection seat 100 is located along a second side of seat pan 104, opposite first side panel 106a. In various embodiments, an ejection handle 108 may be located, for example, proximate a front side 109 of seat pan 104. Front side 109 of seat pan 104 is generally opposite seat back 102. While FIGS. 2A and 2B show ejection handle 108 as located at front side 109, it is further contemplated and understood that ejection handle 108 may be located anywhere that is accessible to an occupant of ejection seat 100. Ejection handle 108 may be configured to initiate an ejection sequence upon actuation. For example, occupant 14 (with momentary reference to FIG. 1) pulling ejection handle 108 in the direction of arrow 115 may initiate the ejection sequence, thereby causing ejection seat 100 to translate in the direction of arrow 113 (with momentary reference to FIG. 1).

In accordance with various embodiments, leg restraint system 120 may include a first leg restraint 110a and a second leg restraint 110b. First and second leg restraints 110a, 110b may comprise, for example, canvas, nylon, aramid fiber (e.g., sold under the mark KEVLAR®), polyethylene terephthalate, and/or any other suitable material. First leg restraint 110a may be coupled between a first anchor strap 112a and a first severance cutter 220a. Second leg restraint 110b may be coupled between a second anchor strap 112b and a second severance cutter 220b.

In various embodiments, first and second anchor straps 112a, 112b may comprise an elastic material, such as natural rubber, synthetic rubber, or other suitable elastomer. First and second anchor straps 112a, 112b may be releasably attached to a fixed structure of ejection seat 100. For example, in various embodiments, first and second anchor straps 112a, 112b may be releasably attached to a front panel of seat pan 104.

In accordance with various embodiments, first severance cutter 220a is coupled to a fixed structure 130a within aircraft 12. In various embodiments, fixed structure 130a may be anchored to a floor 132 of aircraft 12. First severance cutter 220a may be coupled to fixed structure 130a via a lanyard 134a. Second severance cutter 220b is coupled to a fixed structure 130b within aircraft 12. In various embodiments, fixed structure 130b may be anchored to floor 132 of aircraft 12. Second severance cutter 220b may be coupled to fixed structure 130a via a lanyard 134b.

In various embodiments, one or more first pullies 140 may be located between first severance cutter 220a and first anchor strap 112a. First leg restraint 110a may be located through first pullies 140. First pullies 140 may each include a wheel 142 configured to rotate about an axis. First pullies 140 may be configured to allow wheels 142 to rotate in a first direction and to restrict rotation of wheels 142 in a second direction opposite the first direction. For example, each first pully 140 may include a ratchet and pawl or a sprag clutch configured to block or interfere with rotation of wheel 142 in the second direction. In various embodiments, one or more second pullies, similar to first pullies 140, may be located between second leg restraint 110b and second severance cutter 220b. The pullies tend to maintain first and second leg restraints 110a, 110b in the restrained position after severance of first and second leg restraints 110a, 110b (i.e., after first and second leg restraints 110a, 110b are uncoupled or disconnected from fixed structure 130a, 130b).

Figure 3A:
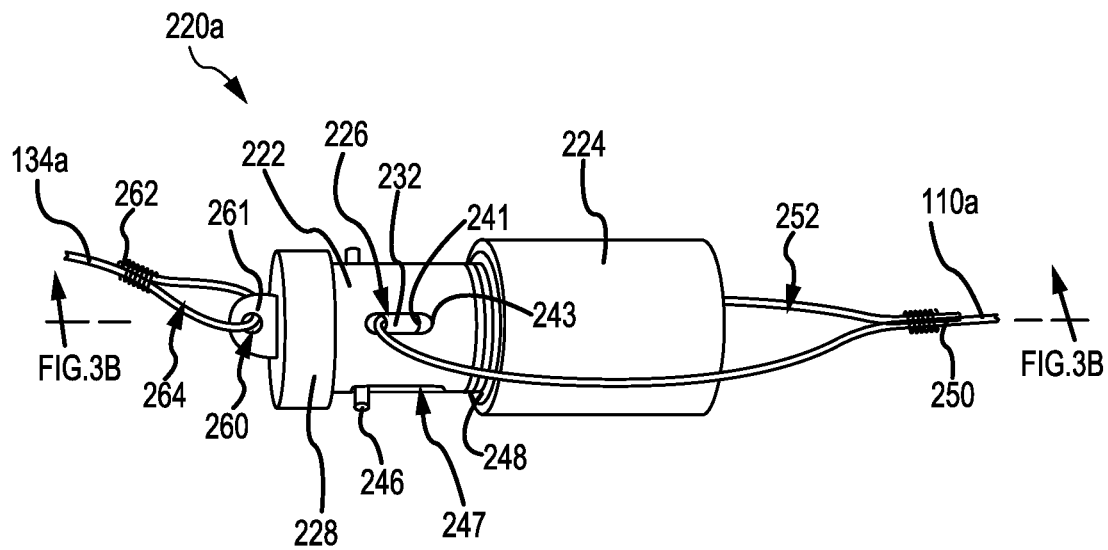
FIGS. 3A and 3B illustrate a perspective view and a cross-section view, respectively, of an adjustable preload severance cutter, in accordance with various embodiments.

With reference to FIG. 3A, additional details of first severance cutter 220a are illustrated. While first severance cutter 220a is described in relation to FIGS. 3A and 3B, it is further contemplated and understood that second severance cutter 220b, with momentary reference to FIG. 2A, includes the elements and functionalities as described herein with respect to first severance cutter 220a.

In accordance with various embodiments, first severance cutter 220a includes a housing 222 and a collar 224 adjustably coupled to housing 222. In various embodiments, collar 224 may be attached to housing 222 via a threaded coupling. In this regard, with momentary reference to FIG. 3B, housing 222 may define a threaded surface 223 configured to engage a threaded surface 225 defined by collar 224. Returning to FIG. 3A, first leg restraint 110a may be located through an opening 226 defined by housing 222. In various embodiments, an end 250 of first leg restraint 110a forms a loop 252, and, at least, a portion of housing 222 may be located through loop 252. End 250 of first leg restraint 110a is located generally opposite, or distal to, first anchor strap 112a, with momentary reference to FIG. 2A.

In various embodiments, first severance cutter 220a may include a cap 228. Cap 228 may be attached to housing 222 opposite collar 224. Lanyard 134a may be coupled to cap 228. In various embodiments, lanyard 134a may be located through an opening 260 defined by a flange 261 extending from cap 228. In various embodiments, an end 262 of lanyard 134a may form a loop 264, and, at least, a portion of cap 228 may be located through loop 264. End 262 of lanyard 134a is located generally opposite, or distal to, fixed structure 130a, with momentary reference to FIG. 2A.

Figure 3B:
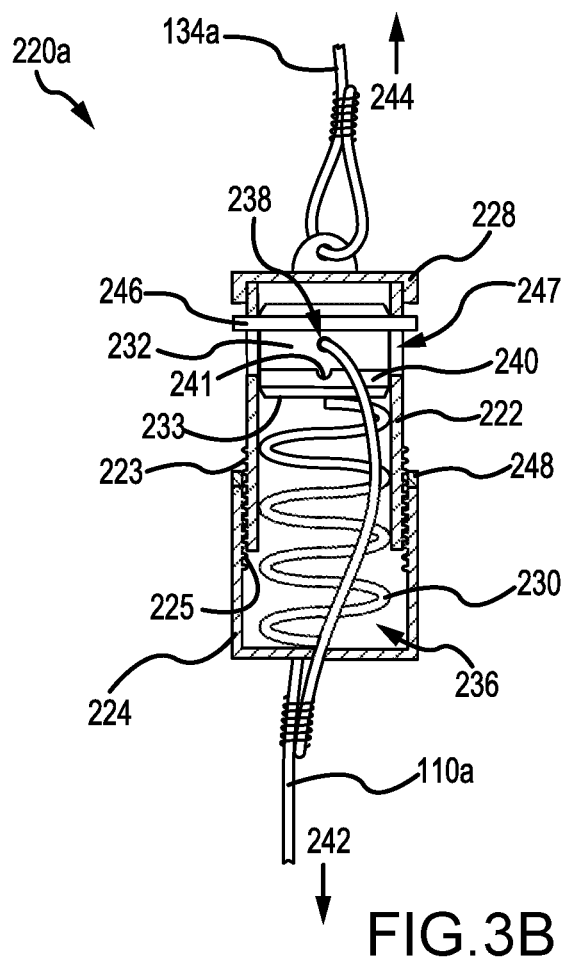

With reference to FIG. 3B, first severance cutter 220a includes a spring 230 and a restraint support 232. Spring 230 and restraint support 232 may be located in an internal volume 236 of first severance cutter 220a. Internal volume 236 may be defined, at least, partially by housing 222 and collar 224. Restraint support 232 may be configured to translate within internal volume 236 and relative to housing 222 and collar 224. Spring 230 is configured to bias restraint support 232 toward cap 228. For example, spring 230 may apply a biasing force against a surface 233 of restraint support 232. Restraint support 232 is coupled to first leg restraint 110a, such that first leg restraint 110a translates with restraint support 232. In various embodiments, first leg restraint 110a may be located through a support opening 238 defined by restraint support 232.

In various embodiments, first severance cutter 220a includes a blade, or "cutter", 240. Blade 240 may be attached to housing 222. Restraint support 232 may translate relative to blade 240. Spring 230 is configured to bias support opening 238 and thus first leg restraint 110a away from blade 240. Blade 240 is configured to sever first leg restraint 110a, in response to translation of restraint support 232 and first leg restraint 110a away from cap 228. In accordance with various embodiments, a load 242 is applied to restraint support 232 by first leg restraint 110a. Spring 230 applies a spring load 244 against restraint support 232 in the opposite direction of load 242. During expulsion of the ejection seat, restraint support 232 will translate first leg restraint 110a into contact with blade 240, in response to the load 242 being applied by first leg restraint 110a exceeding the spring load 244 being applied by spring 230.

Returning to FIG. 3A, in various embodiments, a cutting edge 241 of blade 240 (i.e., the portion of blade 240 which contacts and severs first leg restraint 110a) is aligned with and/or exposed by opening 226 in housing 222. In this regard, the distance between the cutting edge 241 of blade 240 and the portion of first leg restraint 110a located in support opening 238 (FIG. 3B) may be less than the distance between the portion of first leg restraint 110a located in support opening 238 and a distal edge 243 of opening 226. Distal edge 243 may be located farthest from the attachment point of lanyard 134a (e.g., farthest from flange 261 and/or from cap 228). Stated differently, the portion of first leg restraint 110a located in support opening 238 is located closer to cutting edge 241 than to distal edge 243.

With combined reference to FIGS. 3A and 3B, in various embodiments, a roll pin 246 may be attached to and/or located through restraint support 232. Roll pin 246 also extends through pin openings 247 defined by housing 222. Locating roll pin 246 in pin openings 247 tends to restrict or prevent rotation or twisting of restraint support 232 within housing 222. Restricting rotation of restraint support 232 may reduce the probability of first leg restraint 110a being severed before the desired load is achieved.

In accordance with various embodiments, the coupling between collar 224 and housing 222 may allow the load associated with severing first leg restraint 110a (i.e., the load associated with translation of restraint support 232 toward blade 240) to be adjusted. For example, spring 230 is adjustably coupled to restraint support 232, and a preload of spring 230 may be adjusted (i.e., increased or decreased) by translating collar 224 towards and away from cap 228, thereby compressing or decompressing spring 230. In various embodiments, first severance cutter 220a may include a lock nut 248. Lock nut 248 may be configured to prevent or decrease translation of collar 224 relative to housing 222. For example, lock nut 248 may be coupled to housing 222 after a desired preload of spring 230 is achieved. The load associated with severing first leg restraint 110a (i.e., the load associated with translation of restraint support 232) may also be adjusted by employing springs of varying spring constant. In this regard, the same severance cutter may be used in applications with different load demands, as first severance cutter 220a allows the load associated with severance to be tailored to the specific application.

Figure 4A:
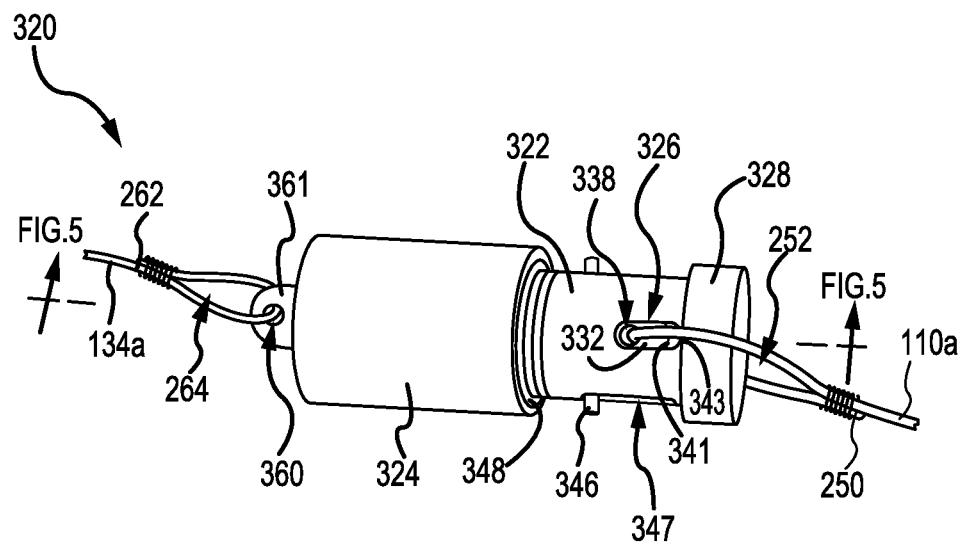
FIGS. 4A and 4B illustrate a perspective view and a cross-section view, respectively, of an adjustable preload severance cutter, in accordance with various embodiments.

With reference to FIG. 4A, a severance cutter 320 is illustrated. In various embodiments, leg restraint system 120, with momentary reference to FIGS. 2A and 2B, may include a severance cutter 320 in place of first severance cutter 220a and/or in place of second severance cutter 220b.

In accordance with various embodiments, severance cutter 320 includes a housing 322 and a collar 324 adjustably coupled to housing 322. In various embodiments, collar 324 may be attached to housing 322 via a threaded coupling, similar to housing 222 and collar 224 in FIG. 3B. First leg restraint 110a may be located through an opening 326 defined by housing 322. In various embodiments, at least, a portion of housing 322 may be located through the loop 252 formed at end 250 of first leg restraint 110a. Lanyard 134a may be coupled to collar 324. In various embodiments, lanyard 134a may be located through an opening 360 defined by a flange 361 extending from collar 324. In various embodiments, end 262 of lanyard 134a may form loop 264, and, at least, a portion of collar 324 may be located through loop 264. In various embodiments, severance cutter 320 may include a cap 328. Cap 328 may be attached to housing 322 opposite collar 324.

Figure 4B:
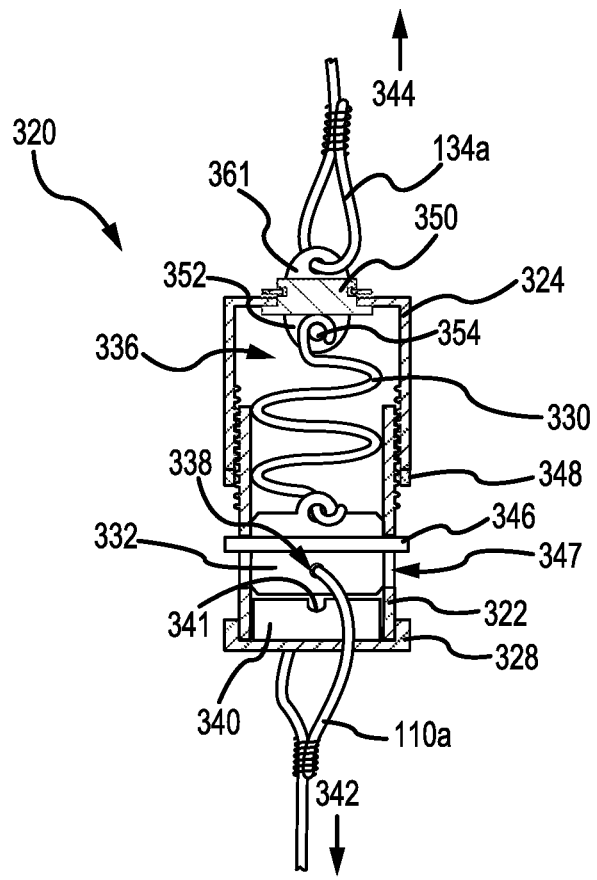

With reference to FIG. 4B, severance cutter 320 includes a spring 330 and a restraint support 332. Spring 330 and restraint support 332 may be located in an internal volume 336 of severance cutter 320. Internal volume 336 may be defined, at least, partially by housing 322 and collar 324. Restraint support 332 may be configured to translate within internal volume 336 and relative to housing 322 and collar 324. Spring 330 is configured to bias restraint support 332 away from cap 328. Restraint support 332 is coupled to first leg restraint 110a, such that first leg restraint 110a translates with restraint support 332. In various embodiments, first leg restraint 110a may be located through a support opening 338 defined by restraint support 332.

In various embodiments, spring 330 may be attached to a spring support 350. Spring support 350 may be coupled to collar 324. In various embodiments, spring support 350 may be coupled to collar 324 such that spring support 350 can rotate relative to collar 324. In various embodiments, flange 361 may extend from spring support 350. In various embodiments, spring support 350 may include a pair of lugs 352. Lugs 352 may extend into internal volume 336. A support pin 354 may be coupled to and/or extend between the lugs 352. Spring 330 may be coupled to the support pin 354. In various embodiments, spring support 350 may include one lug extending into internal volume 336, with the lug defining an opening through which spring 330 is located.

In various embodiments, severance cutter 320 includes a blade, or "cutter", 340. Blade 340 may be attached to housing 322. Restraint support 332 may translate relative to blade 340. Spring 330 is configured to bias support opening 338 away from blade 340. Blade 340 is configured to sever first leg restraint 110a, in response to translation of restraint support 332 and first leg restraint 110a toward cap 328. In various embodiments, a load 342 is applied to restraint support 332 by first leg restraint 110a. Spring 330 applies a spring load 344 to restraint support 332 in the opposite direction of load 342. With combined reference to FIG. 2A and FIG. 4B, during expulsion of ejection seat 100, ejection seat 100 translates away from fixed structure 130a. As ejection seat 100 translates away from fixed structure 130a, the load 342 being applied by first leg restraint 110a increases. Restraint support 332 is configured to translate first leg restraint 110a into contact with blade 340, in response to the load 342 being applied by first leg restraint 110a exceeding the spring load 344 being applied by spring 330.

Returning to FIG. 4A, in various embodiments, a cutting edge 341 of blade 340 (i.e., the portion of blade 340 which contacts and severs first leg restraint 110a) is aligned with and/or exposed by opening 326 in housing 322. The distance between the cutting edge 341 of blade 340 and the portion of first leg restraint 110a located in support opening 338 may be less than the distance between the portion of first leg restraint 110a located in support opening 338 and a distal edge 343 of opening 326. Distal edge 343 may be located farthest from the attachment point of lanyard 134a (e.g., farthest from flange 361 and/or from collar 324). Stated differently, the portion of first leg restraint 110a located in support opening 338 is located closer to cutting edge 341 than to distal edge 343.

With combined reference to FIGS. 4A and 4B, in various embodiments, a roll pin 346 may be attached to and/or located through restraint support 332. Roll pin 346 also extends through pin openings 347 defined by housing 322. Locating roll pin 346 in pin openings 347 tends to restrict or prevent rotation or twisting of restraint support 332 within housing 322. Restricting rotation of restraint support 332 may reduce the probability of first leg restraint 110a being severed before the desired load is achieved.

In accordance with various embodiments, the coupling between collar 324 and housing 322 allows the load 342 associated with severing first leg restraint 110a (i.e., the load associated with translation of restraint support 332 toward blade 340) to be adjusted. For example, spring 330 is adjustably coupled to restraint support 332, and a preload of spring 330 may be adjusted (i.e., increased or decreased) by translating collar 324 towards and away from cap 328, thereby increasing or decreasing the tension of spring 330. In various embodiments, severance cutter 320 may include a lock nut 348. Lock nut 348 may be configured to prevent or decrease translation of collar 324 relative to housing 322. For example, lock nut 348 may be coupled to housing 322 after a desired preload of spring 330 is achieved. The load associated with severing first leg restraint 110a (i.e., the load associated with translation of restraint support 332) may also be adjusted by employing springs of varying spring constant. In this regard, the same severance cutter may be used in applications with different load demands, as severance cutter 320 allows the load associated with severance to be tailored to the specific application.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A severance cutter, comprising:
 a housing;
 a blade coupled to the housing;
 a restraint support configured to translate relative to the blade; and
 a spring adjustably coupled to the restraint support, wherein the spring is configured to bias a support opening defined by the restraint support away from the blade.

2. The severance cutter of claim 1, further comprising a cap coupled to the housing.

3. The severance cutter of claim 2, wherein the spring is configured to bias the restraint support toward the cap.

4. The severance cutter of claim 2, wherein the spring is configured to bias the restraint support away from the cap.

5. The severance cutter of claim 1, wherein the housing defines an opening, and wherein a cutting edge of the blade is exposed by the opening.

6. The severance cutter of claim 1, further comprising a collar adjustably coupled to the housing.

7. The severance cutter of claim 6, wherein the housing defines a first threaded surface configured to engage a second threaded surface defined by the collar.

8. A leg restraint system for an ejection seat, comprising:
   a leg restraint;
   a pully operably coupled to the leg restraint, the pully including a wheel, wherein the leg restraint is located through the pully, wherein the pully is configured to allow the wheel to rotate in a first direction and to restrict a rotation of the wheel in a second direction opposite the first direction; and
   a severance cutter coupled to an end of the leg restraint, the severance cutter including:
      a housing;
      a blade coupled to the housing;
      a restraint support configured to translate relative to the blade, wherein the leg restraint is located through a support opening defined by the restraint support; and
      a spring adjustably coupled to the restraint support, wherein the spring is configured to bias the leg restraint away from the blade.

9. The leg restraint system of claim 8, wherein the severance cutter further comprises:
   a collar adjustably coupled to the housing; and
   a cap coupled to the housing.

10. The leg restraint system of claim 9, wherein the spring is configured to bias the restraint support toward the cap.

11. The leg restraint system of claim 9, wherein the spring is configured to bias the restraint support away from the cap.

12. The leg restraint system of claim 9, wherein the housing defines an opening, and wherein the leg restraint is located through the opening.

13. The leg restraint system of claim 9, wherein the severance cutter further includes a lock nut configured to restrict translation of the collar relative to the housing.

14. The leg restraint system of claim 13, wherein a load associated with translating the restraint support is increased by translating the collar relative to the housing.

15. The leg restraint system of claim 14, wherein the housing defines a first threaded surface configured to engage a second threaded surface defined by the collar.

16. The leg restraint system of claim 9, further comprising a lanyard coupled to at least one of the cap or the collar.

17. An ejection seat, comprising:
   a seat pan;
   a leg restraint coupled to the seat pan; and
   a severance cutter coupled to an end of the leg restraint, the severance cutter including:
      a housing;
      a blade coupled to the housing;
      a restraint support configured to translate relative to the blade, wherein the leg restraint is located through a support opening defined by the restraint support; and
      a spring configured to bias the leg restraint away from the blade.

18. The ejection seat of claim 17, wherein the severance cutter further comprises a cap coupled to the housing, and wherein the spring is configured to bias the restraint support toward the cap.

19. The ejection seat of claim 17, wherein the severance cutter further comprises a cap coupled to the housing, and wherein the spring is configured to bias the restraint support away from the cap.

20. The ejection seat of claim 17, further comprising a collar adjustably coupled to the housing, wherein a load associated with translating the restraint support is increased by translating the collar relative to the housing.

* * * * *